United States Patent
Appleton

(10) Patent No.: US 10,635,664 B2
(45) Date of Patent: *Apr. 28, 2020

(54) MAP-REDUCE JOB VIRTUALIZATION

(71) Applicant: Red Hat, Inc., Raleigh, NC (US)

(72) Inventor: Shaun David Appleton, Hook (GB)

(73) Assignee: Red Hat, Inc., Raleigh, NC (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/875,518

(22) Filed: Jan. 19, 2018

(65) Prior Publication Data

US 2018/0144025 A1 May 24, 2018

Related U.S. Application Data

(63) Continuation of application No. 14/504,237, filed on Oct. 1, 2014, now Pat. No. 9,910,888.

(51) Int. Cl.
*G06F 7/02* (2006.01)
*G06F 16/00* (2019.01)
(Continued)

(52) U.S. Cl.
CPC ........... *G06F 16/245* (2019.01); *G06F 9/46* (2013.01); *G06F 9/5066* (2013.01); *G06F 16/21* (2019.01); *G06F 16/27* (2019.01); *G06F 16/285* (2019.01)

(58) Field of Classification Search
CPC ........... G06F 17/30598; G06F 16/285; G06F 9/5066; G06F 17/30424; G06F 16/245;
(Continued)

(56) References Cited

U.S. PATENT DOCUMENTS 9,886,473 B2 * 2/2018 Zhao .................. G06F 16/24
2013/0086356 A1 4/2013 Narang et al.
(Continued)

FOREIGN PATENT DOCUMENTS

KR 2013-0060746 A 6/2013

OTHER PUBLICATIONS

Marozzo, Fabrizio; Talia, Domenico; Trunfio, Paolo "P2P-MapReduce: Parallel data processing in dynamic Cloud environments" DEIS, University of Calabria May 20, 2011 available at http://grid.deis.unical.it/papers/pdf/MarozzoTaliaTrunfioJCSS2012.pdf. 27 pages.

(Continued)

*Primary Examiner* — Bruce M Moser
(74) *Attorney, Agent, or Firm* — Lowenstein Sandler LLP

(57) ABSTRACT

A method and system is disclosed that identifies a job written in a first language. The job is to be performed in parallel on a plurality of nodes of a plurality of clusters. The first language describes functions supported by multiple frameworks but is not specific to any of the multiple frameworks. The method and system select one or more clusters from the plurality of clusters to run the job. The selected one or more clusters of the plurality of clusters operate a different framework from other clusters of the plurality of clusters. The method and system identify a second language associated with the selected one or more clusters. The method and system convert the first language of the job into the second language and cause the job in the second language to be run on the plurality of nodes of the selected one or more clusters.

20 Claims, 5 Drawing Sheets

(51) Int. Cl.
*G06F 16/245* (2019.01)
*G06F 16/27* (2019.01)
*G06F 16/28* (2019.01)
*G06F 9/46* (2006.01)
*G06F 9/50* (2006.01)
*G06F 16/21* (2019.01)

(58) Field of Classification Search
CPC ............... G06F 17/30283; G06F 16/27; G06F 17/30575; G06F 16/273; G06F 17/30289; G06F 16/21
See application file for complete search history.

(56) References Cited

U.S. PATENT DOCUMENTS

| | | | |
|---|---|---|---|
| 2013/0298111 A1 | 11/2013 | Koseki et al. | |
| 2013/0318525 A1 | 11/2013 | Palanisamy et al. | |
| 2014/0067792 A1 | 3/2014 | Erdogan et al. | |
| 2014/0156849 A1 | 6/2014 | Kim et al. | |
| 2014/0172809 A1 | 6/2014 | Gardella et al. | |
| 2014/0201114 A1 | 7/2014 | Tamano | |
| 2014/0279857 A1 | 9/2014 | Bharadwaj et al. | |
| 2015/0058843 A1* | 2/2015 | Holler | G06F 9/455 718/1 |
| 2015/0205625 A1* | 7/2015 | He | G06F 9/455 718/1 |
| 2015/0277990 A1 | 10/2015 | Xiong et al. | |
| 2015/0347101 A1 | 12/2015 | Boehm et al. | |
| 2016/0092548 A1 | 3/2016 | Shivarudraiah et al. | |
| 2017/0109210 A1* | 4/2017 | Goossens | G06F 8/44 |

OTHER PUBLICATIONS

Dean, Jeffrey; Ghemawat, Sanjay; "MapReduce: Simplified Data Processing on Large Clusters" Google Inc.to appear in OSDI 2004, available at http://static.googleusercontent.com/media/research.google.com/es/us/archive/mapreduce-osdi04.pdf. 13 pages.

Lifflander, Jonathan; Arya, Anshu "Automatic Conversion of Functional Sequences to Map Reduce with Dynamic Path Selection" University of Illinois Urbana Champaign available at https://wiki.cites.illinois.edu/wiki/. 2 pages.

Luo et al., "A Hierarchical Framework for Cross-Domain MapReduce Execution," ECMLS, Jun. 8, 2011.

MapReduce Across Distributed Clusters for Data-Intensive Applications, Wang, Lizhe et al., IEEE International Parallel and Distributed Processing Symposium 2012.

The Apache Software Foundation Apache Hadoop NextGen MapReduce (YARN) Version 2.5.1 Sep. 5, 2014, http://www.apache.org.

* cited by examiner

MAP-REDUCE JOB VIRTUALIZATION

CROSS-REFERENCE TO RELATED APPLICATION

This application is a continuation of U.S. patent application Ser. No. 14/504,237, filed on Oct. 1, 2014, the entire contents of which is hereby incorporated by reference herein.

TECHNICAL FIELD

This disclosure is related generally to processing large data sets, and more particularly, to methods of performing map-reduce jobs.

BACKGROUND

Map-reduce is a programming model for processing large data sets. The map-reduce programming model comprises a map procedure that performs filtering and sorting and a reduce procedure that perform a summary operation. Typically, a map-reduce job is performed on clusters of computers, such as clusters of storage servers in a distributed file system. For example, a file system may have clusters of storage servers, such that each cluster includes a master node and one or more worker nodes. During the "map" phase, a master node may receive a job request to perform an operation using a file or data located in the memory. The master node may divide the job into smaller sub-jobs, and may distribute the sub-jobs to the worker nodes. The worker nodes may process the sub-jobs in parallel and may pass the results back to the master node. During the "reduce" phase, the master node may collect the results of the sub-jobs and combine the results by performing a summary operation to form the output for the job request.

BRIEF DESCRIPTION OF THE DRAWINGS

The disclosure may be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Systems and methods for map-reduce virtualization are described. A map-reduce job may be performed by different map-reduce frameworks. For example, each cluster of computers may run different map-reduce frameworks such as, Hadoop, Hazelcast, MongoDB, Infinispan, Spark, etc. Each framework may support a map-reduce job written specifically for the corresponding framework. For example, Infinispan may process map-reduce jobs written for an Infinispan framework, while Hadoop may process map-reduce jobs written for a Hadoop framework. However, a cluster running Infinispan cannot process a map-reduce job written for a cluster running Hadoop and vice versa. Since different clusters of servers may execute different map-reduce frameworks, clusters running different frameworks may be incompatible. It may be desirable to migrate a map-reduce job to a different map-reduce framework in order to obtain a benefit of the framework or to standardize a map-reduce framework across a network. Since map-reduce jobs written for different frameworks may be incompatible, migrating existing map-reduce jobs across clusters running different frameworks may be untenable. An administrator must write different map-reduce jobs, each for a different map-reduce framework, in order to execute a map-reduce job on computer clusters hosting different map-reduce frameworks.

In one example, a map-reduce service machine receives a map-reduce job written in a first map-reduce language from a client machine. A map-reduce management module running on the map-reduce service machine identifies one or more clusters to run the map-reduce job, by evaluating the availability of resources of the clusters, the load of the clusters, the availability of the data on the clusters, and characteristics of the clusters (e.g., disk-based storage, memory-based storage). The map-reduce management module may also convert the map-reduce job into another map-reduce language that corresponds to the map-reduce framework running on the selected clusters, as the original language of the map-reduce job may be incompatible with the framework running on the selected clusters. Additionally, the result of the map-reduce job may be represented in the language supported by the framework running on the selected clusters. The map-reduce management module may convert the result into the original map-reduce language.

Figure 1:
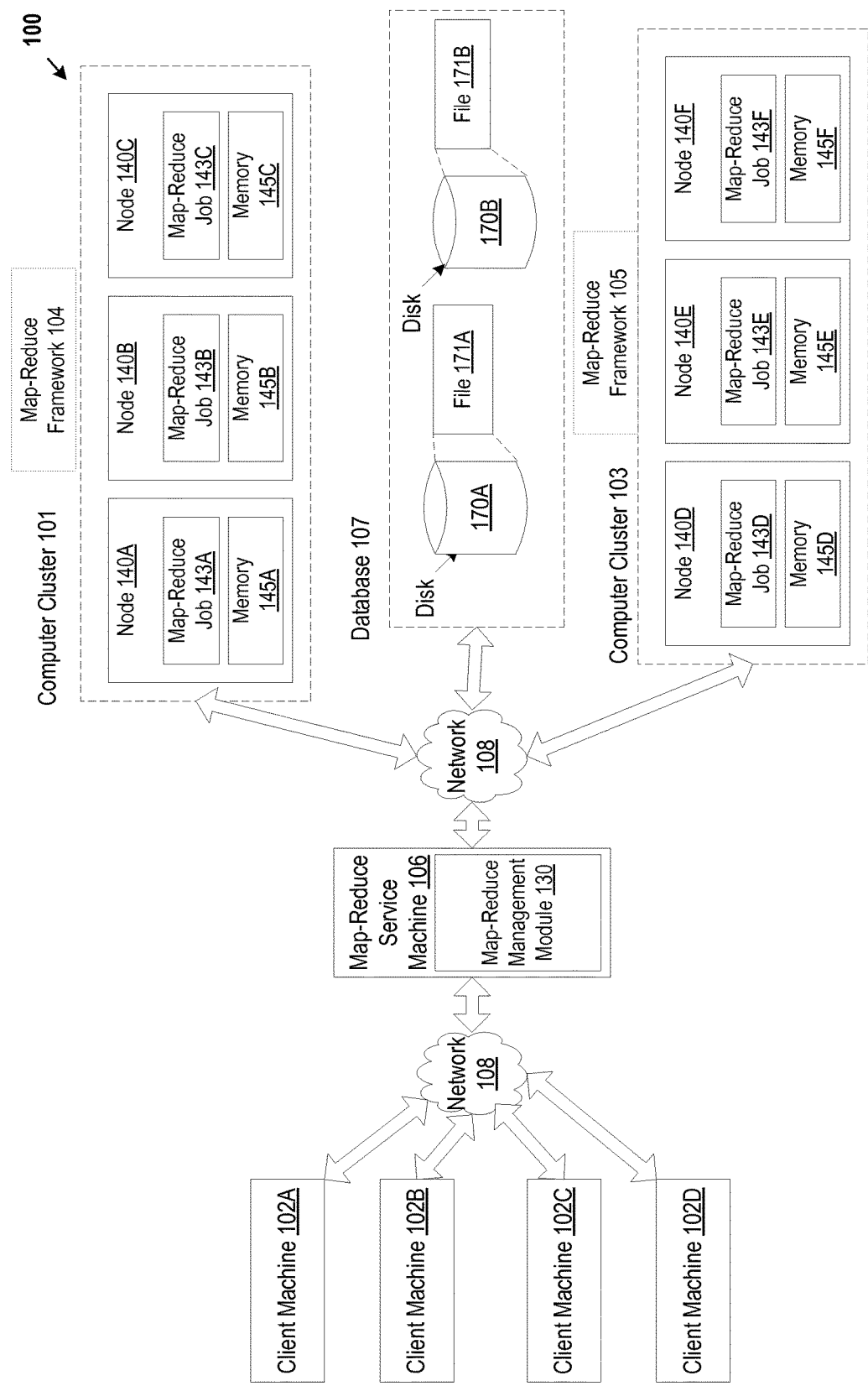
FIG. 1 is a block diagram of an example system architecture, in accordance with various implementations.

FIG. 1 is a block diagram of an example system architecture implementing the systems and methods described herein. The system architecture 100 may include one or more client machines 102A-D coupled to a map-reduce service machine 106 via a network 108. Map-reduce service machine 106 is coupled to computer cluster 101, computer cluster 103, and database 107 via network 108. A computer cluster, such as computer cluster 101 and computer cluster 103, may comprise a set of interconnected computers or nodes that may be configured to perform a common task so that the computer cluster may be viewed as a single computer system. The nodes of a cluster may be connected to each other through a network, such as network 108, with each node (e.g., node 140A-F) running its own instance of an operating system.

A developer may write a separate map-reduce job for each cluster running a different map-reduce framework. In one example, one or more client devices (e.g., 102A-D) submit a map-reduce (MR) job that is received by map-reduce service machine 106. Map-reduce service machine 106 may receive an MR job written in any language of a supported set of languages, including a language that is specifically designated as a general map-reduce language. The general MR language may be a single universal language that describes the functions that may be implemented by each of the multiple map-reduce frameworks. Alternatively, the general MR language may be an MR language that corresponds to a specific MR framework. After receiving an MR job, map-reduce management module 130 selects one or more computer clusters (e.g., computer cluster 101 or computer cluster 103) on which to run the MR job. The selection may be performed based on the load of each cluster, availability of each cluster, characteristics of each cluster, the framework of each cluster, and/or the location of the data to be processed. Once one or more clusters are selected, map-reduce management module 130 converts the MR job written in an original language into an MR job written in a map-reduce language that is compatible with the map-reduce framework of the selected computer clusters. Map-reduce service machine 106 sends the MR job in the appropriate MR framework language to the selected computer clusters. For example, map-reduce service machine 106 determines that MR job A is to be performed on computer cluster 101. Computer cluster 101 may run the Infinispan MR framework. Map-reduce service machine 106 converts the MR job A written in a general MR language into an MR job written for the Infinispan framework and sends the converted MR job to computer cluster 101 to be performed. Each computer cluster includes multiple nodes, such as node 140A-C of computer cluster 101. Each node may execute all or part of the converted MR job received from map-reduce service machine 106. Each node may have memory hardware and may also communicate with a database (e.g., database 107) and/or local storage (not shown). Each cluster may operate a different MR framework as illustrated by map-reduce framework 104 and 105. Map-reduce service machine 106 receives a result of the MR job, which may be in the MR language of the MR framework executed on the cluster, and converts the result written in the framework-specific language into results written in the general MR language.

The client machine 102A-D, map-reduce service machine 106, database 107, computer cluster 101, and computer cluster 103 may be coupled via network 108 that communicates any of the standard protocols for the exchange of information. Some or all of client machines 102A-D, map-reduce service machine 106, database 107, computer cluster 101, and computer cluster 103 may run on a Local Area Network (LAN) and may be incorporated into the same physical or logical system, or different physical or logical systems. Alternatively, some or all of client machines 102A-D, map-reduce service machine 106, database 107, computer cluster 101, and computer cluster 103 may reside on different LANs that may be coupled together via the Internet but separated by firewalls, routers, and/or other network devices. In yet another configuration, some or all of client machine 102A-D, map-reduce service machine 106, database 107, computer cluster 101, and computer cluster 103 may reside on a server, or different servers, coupled to other devices via a public network (e.g., the Internet) or a private network (e.g., LAN). The network 108 may be a public network, a private network, or a combination thereof. Network 108 may include a wireless infrastructure. The wireless infrastructure may be provided by one or multiple wireless communications systems, such as a wireless fidelity (Wi-Fi) hotspot connected with the network 108 and/or a wireless carrier system that may be implemented using various data processing equipment, communication towers, etc. It should be noted that various other network configurations may be used including, for example, hosted configurations, distributed configurations, centralized configurations, etc. It also should be noted that each node of a computer cluster may be connected to another node of the same cluster or to other nodes of different clusters via network 108 in the same manner as described above.

The computer cluster 101 and computer cluster 103 may comprise a network attached storage file system that includes any number of mass storage devices, such as magnetic or optical storage based disks 170A-B, solid-state drives (SSDs) or hard drives, coupled to computer cluster 101 and computer cluster 103 via the network 108. Computer cluster 101 and computer cluster 103, and each node of the aforementioned clusters, can further implement various network-accessible server-based functionality (not shown) or include other data processing equipment.

Each computer cluster, such as computer cluster 101 and computer cluster 103, may contain one or more nodes. For example, computer cluster 101 includes nodes 140A, 140B, and 140C. Computer cluster 103 includes nodes 140D, 140E, and 140F. Each node of computer cluster 101 and computer cluster 103 may include, but is not limited to, any data processing device, such as a desktop computer, a laptop computer, a mainframe computer, a personal digital assistant, a server computer, a hand-held device or any other device configured to process data.

Each node of computer cluster 101 and computer cluster 103 may have its own physical or virtual memory. For example, memory 145A, 145B, 145C, 145D, 145E, and 145F correspond to node 140A, 140B, 140C, 140D, 140E, and 140F, respectively. Memory may include, but is not limited to, main memory such as, read-only memory (ROM), flash memory, dynamic random access memory (DRAM) (e.g., synchronous DRAM (SDRAM) or DRAM (RDRAM), etc.), and static memory (e.g., flash memory, static random access memory (SRAM), etc.). It should also be noted that each node of computer cluster 101 and computer cluster 103 may have data stored on local storage (not shown), such as local storage disks.

Each node of computer cluster 101 and computer cluster 103 may execute all or part of a map-reduce job. The execution of all or part of one or more map-reduce jobs is illustrated by map-reduce job 143A, 143B, 143C, 143D, 143E, and 143F running on their respective nodes. It may be appreciated by one skilled in the art that a single map-reduce job may run on one or more nodes of one or more clusters in parallel.

Each computer cluster, such as computer cluster 101 and computer cluster 103, may run the same or different map-reduce frameworks. FIG. 1 illustrates computer cluster 101 operating map-reduce framework 104 and computer cluster 103 operating map-reduce framework 105. For the sake of illustration, map-reduce framework 104 and map-reduce framework 105 may be considered different map-reduce frameworks, unless stated otherwise. As stated above, each map-reduce framework uses a different map-reduce language. Each node of each cluster is configured to run a specific map-reduce framework. For example, node 140A, 140B and 140C are configured to run map-reduce framework 104, while node 140D, 140E, and 140F are configured to run map-reduce framework 105. Each MR framework is implemented with a programming language specific to the MR framework. Each framework implements a variety of different functions specific to each framework and each framework executes similar functions in a different manner. Different frameworks include frameworks such as, Hadoop, Hazelcast, MongoDB, Infinispan, and Spark.

Computer cluster 101 and computer cluster 103 may organize data in database 107. For example, database 107 may store data on storage devices 107A and 107B (e.g., storage disks). Data in database 107 may be located in data files 171A-B and organized using volumes. A volume is a single accessible storage area of database 107, which may be resident on a single partition of a hard disk (e.g., disks 170A-B) of the database 107. A volume may be a representation of a logical location, rather than a physical location, of a storage area in database 107. For example, physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1.

The database 107 may store data as files 171A-B and may include directories, also referred to as folders, which are virtual containers within the database 107, in which groups of computer files 171A-B and possibly other directories may be kept and organized. Related files 171A-B may be stored in the same directory. A sub-directory, also referred to as a sub-folder, is a directory contained inside another directory. The top-most directory is referred to as a root or top-level directory within the database 107. Together, the directories form a hierarchy, or tree structure of one or more levels in the database 107.

The client machines 102A-D may host various applications, including, for example, web applications, desktop applications, browser applications, etc. In one implementation, an application is a map-reduce interface application (not shown). The map-reduce interface application may allow a user of a client machine to send a map-reduce job to be processed and may receive a result of a map-reduce job. The map-reduce interface application may allow the client machine to interact with map-reduce service machine 106. The map-reduce interface application may allow a user to submit a map-reduce job written in a general map-reduce language to map-reduce service machine 106.

Map-reduce service machine 106 receives map-reduce jobs submitted by client machines 102A-D. Map-reduce service machine 106 may also receive information from computer cluster 101, computer cluster 103, and database 107. The information may include an interim and final result of the map-reduce job. The map-reduce service machine 106 may be a server or a controller device. Map-reduce service machine 106 may include, but is not limited to, any data processing device, such as a desktop computer, a laptop computer, a mainframe computer, a personal digital assistant, a server computer, a hand-held device or any other device configured to process data.

Map-reduce service machine 106 may contain map-reduce management module 130. Map-reduce management module 130 may receive one or more MR jobs from the client machines 102A-D. MR management module 130 may select one or more computer clusters on which each MR job is to be executed, based on the load on a cluster or a node of a cluster, the availability of a cluster or a node of a cluster, the location of the data, and a characteristic of the cluster or a node of the cluster. Once the MR job is sent to one or more clusters, the MR manager module 130 may monitor the progress of the MR job being executed on the selected clusters and may determine, based on the above described cluster selection rules, that the MR job should be migrated to a different cluster.

Map-reduce management module 130 may convert a map-reduce job written in a general MR language into a specific MR language corresponding to the MR framework running on selected computer clusters. For example, the Hadoop MR framework may execute MR jobs written in the Hadoop language. The Infinispan MR framework may execute MR jobs written in an Infinispan language. It should be noted that in the preceding example, a map-reduce job may be written in the software language, Java, for both the Hadoop and Infinispan frameworks, but in each case is programmed to use the Hadoop Java API or the Infinispan Java API, respectively. An MR job written for a Hadoop framework is incompatible with an Infinispan framework and vice versa. A map-reduce framework language, such as the Hadoop language or the Infinispan language, may refer to a software language that is programmed to use the corresponding framework API.

In one example, a general map-reduce language may be used to implement a map-reduce job. The general map-reduce language may be implemented using any programming language. An interpreter or the general MR language is implemented in the selected language. Alternatively, the general MR language is a library implemented in the selected language. For example, the general MR language may be written in Java, C++, Python, etc. For purposes of illustration, the general MR language may be described as modeled in view of the Java syntax, unless otherwise noted. It should be appreciated that the general MR language is not limited to Java, but may be any programming language. Functions written in the general MR language may be mapped to the functions written in the one or more framework languages. For example, a map function, map( ), written in the general MR language may be mapped to the map function, map( ), in Hadoop, Infinispan, and Spark, etc. The map function, map( ), written in general MR language, may be mapped to the Spark map function written in Python. The general MR language may map functions written in the general MR language to all the functions required to execute an MR job to each of the corresponding functions of the different MR frameworks. A function specific to a particular MR framework may have a corresponding function in a general MR language. The mapping may be stored on map-reduce service machine 106 or on separate database, such as database 107. Alternatively, it should be noted that the general MR language may be written in a specific framework language in which case the same mapping principles as described above apply. If the general MR language is a specific framework language or a universal language, each function of the general MR language may be mapped to one or more functions of another language, and the mapping may further comprise one or more rules of defining values of parameters of the target language functions based on parameters of the general language functions.

Map-reduce management module 130 may translate the result of an MR job executed on selected clusters into the general MR language. During and after the execution of an MR job, the selected clusters may send to the MR service machine 106 the result. The result may be in the framework language running in the selected clusters. For example, the result of an MR job for a Hadoop cluster may be sent to MR reduce service machine 106 described in the Hadoop language. The MR management module 130 may translate the result, for example described in the Hadoop language, into the general MR language. A mapping technique, as described above, may be implemented for the conversion of the MR job result to the general MR language. Map-reduce management module may be discussed in more detail in regards to FIGS. 2-5.

It should be noted that an MR job includes multiple functions. It should be appreciated that an MR job may describe a complete execution all the functions and includes an initial input and final output. Alternatively, an MR job may indicate one or more functions or steps in executing an MR job. For example, an MR job may refer to the map function or the reduce function.

Figure 2:
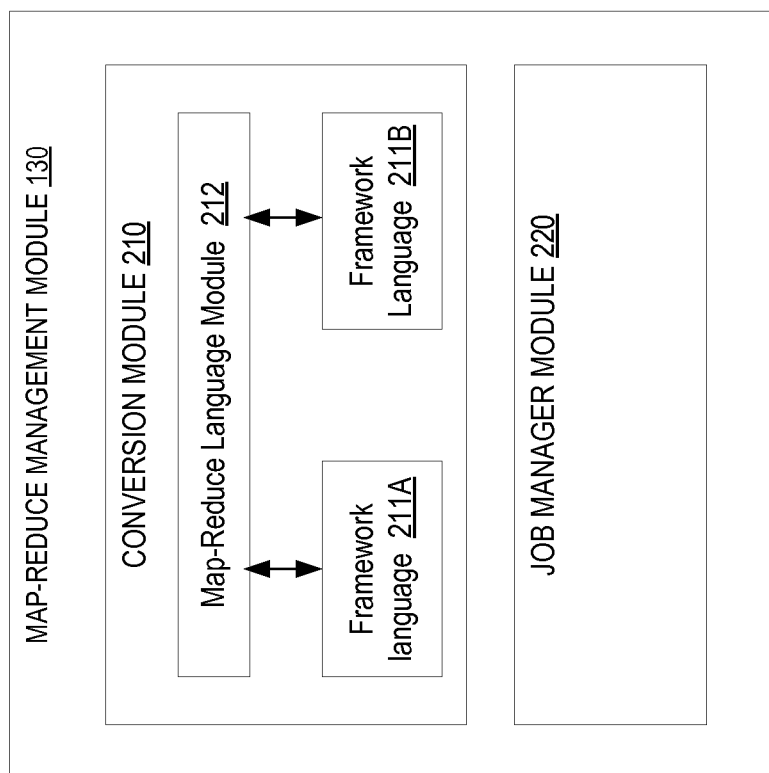
FIG. 2 is a block diagram illustrating an example of a map-reduce management module.

FIG. 2 is a block diagram illustrating an example of a map-reduce management module. Map-reduce management module 130 includes conversion module 210 and job manager module 220. Map-reduce management module 130 may be implemented on a map-reduce service machine 106, as illustrated in FIG. 1. Map-reduce management module 130 may also be implemented on a client machine, such as client machine 102A-D. Parts of map-reduce management module 130 may be implemented on client machine 102A-D, while other parts of map-reduce management module 130 may be implemented on map-reduce service machine 106.

Conversion module 210 includes map-reduce language module 212 that converts statements written in the general MR language to statements written in specific MR languages, as illustrated by framework language 211A and framework language 211B. It should be noted that map-reduce language module 212 may convert the general MR language into more than two MR framework languages. Map-reduce language module 212 also may convert each language (e.g., framework language 211A and framework language 211B) into the general MR language. It should be noted that a language corresponds to the specific MR language for a particular MR framework.

In one example, a map-reduce job written in a general MR language may be received by map-reduce management module 130. Job manager module 220 selects one or more clusters (e.g., computer clusters 101 and 103) on which to run the map-reduce job. In selecting the one or more clusters, job manager module 220 may determine if one or more clusters are available to perform the map-reduce job. If the one or more clusters are not available, job manager module 220 may select a different cluster on which to run the MR job. In one example, availability refers to map-reduce management module's ability to communicate with the cluster. In another example, availability refers to the ability of the selected cluster to perform the map-reduce job. In another example, availability refers to the number of nodes of the cluster able to perform a map-reduce job compared to the total number of nodes in a cluster. Availability may be measured as a percentage with the number of nodes of a cluster able to perform a map-reduce job divided by the total number of nodes of the cluster. For example, if a cluster includes 10 nodes and 4 have hardware failures and 6 are able to perform the map-reduce job, then the availability is 60%. A user or administrator may specify an availability threshold which when exceeded, the job manager module 220 may determine that the cluster is available for purposes of processing a map-reduce job. An availability threshold may be set at a percentage, measured as the number of nodes in a cluster able to perform a map-reduce job over the total number of nodes in the cluster. In the previous example, if the availability threshold were set at 50%, and availability is 60%, job-manager module may determine the cluster is available. If the job manager module 220 is not able to communicate with the cluster, then the cluster is said to be unavailable. In one example, a cluster may not be available if the cluster is off-line or not available perform the MR job. Additionally, job manager module 220 may determine the availability of clusters even though the clusters operate different MR frameworks. For example, job manager module 220 may determine that a cluster running Hadoop is available, while a cluster running Infinispan is not available. It should be noted that individual nodes of a cluster may be available in the same manner as computer clusters. It should also be noted that the term "resource" may be used to refer to a computer cluster, a computer node, and any computer hardware or software associated with a computer cluster or node.

In one example, in selecting the one or more clusters, job manager module 220 may determine the load of the selected clusters. The load of a cluster may be an indication of the degree or percentage to which the resources of a cluster are being used or scheduled to be used. In one example, load may be central processing unit (CPU) usage which is the sum of the number of current processes and processes waiting to be run (i.e., queued processes) for a time period over the total number of processes a CPU is capable of running for the time period. In another example, load may be one or more of CPU, network, or memory usage which is the amount of data traffic on the one or more of the CPU, network, or memory of a node or cluster for a given time period divided by the amount of data traffic the one or more of the CPU, network, or memory may handle for the given time period. Load may be measured as a percentage as defined above. Load may be calculated for a node, a cluster, or a group of nodes of a cluster. Job manager module 220 may send a query using a system call to the operating system of a node or cluster in order to obtain the load of the node, cluster, or group of nodes in the cluster. The results of the query may be sent to a client machine, such as client machine 102A-D. If the load on a particular cluster exceeds a threshold load level, job manager module 220 may select a different cluster. A developer or administrator may determine the threshold load level. Alternatively, the threshold load level may be set at the lowest load detected by job manager module 220. In determining the load, job manager module 220 may look at the use of resources associated with the cluster and determine the speed an MR job may be completed on a particular cluster. Job manager module 220 may determine the difference between the loads of computer clusters operating different frameworks. For example, a computer cluster running Infinispan may have a 20% load, while a computer cluster running Hadoop may have a 70% load. In one example, the threshold load level may be any arbitrary value determined by a developer or administrator. For example, an administrator may determine that if the load of the selected clusters exceeds 60%, job-manager module 220 should select another cluster to run the MR job. The load of each computer cluster running different frameworks may be measured prior to selecting a cluster on which to run the job. In another example, the threshold load level may be set at the load of the least loaded cluster for which load has been determined. For example, in the above example job manager module may select the Infinispan cluster because its load of 20% is less than the load of Hadoop cluster of 70%. The threshold load level may be set at 20%, and may be reset if a load for another cluster is determined to be lower than 20%.

In one example, in selecting the one or more clusters, job manager module 220 may determine if the data to be processed by the map-reduce job is available to the selected clusters. If the data to be processed by the map-reduce job is not available to the selected clusters, job manager module 220 may cause the data to be moved in order to make the data available to the selected clusters. The data may be moved from storage device 170A and 170B to memory 145A, 145B, or 145C, and vice versa. The data may be moved between any of database 107, disk 170A-B, Memory 145A-F, or local disk memory of node 140A-F.

In another example, in selecting the one or more clusters, job manager module 220 may query each cluster of the plurality of clusters for an indication of a characteristic of each cluster. Each cluster may run a different software framework. The characteristics include the storage type (e.g., disk-based storage or memory-based storage). Data in memory-based storage typically has a faster access time than data on disk-based storage. An MR job that uses data located on memory-based storage is typically faster than an MR job run on data located on disk-based storage. Memory-based storage may be provided by memory 145A-F and described in conjunction with FIG. 1. Disk-based storage may be provided by storage devices 170A-B and described in conjunction with FIG. 1. Disk-based storage may also be hard-disk storage associated locally with each node 140A-F. Different MR frameworks may access data in different ways. One difference may be the location of the data on which the MR job is to process. An MR job may process data located on memory-based storage or disk-based storage. Job manager module 220 may query each cluster using a system call requesting the characteristic of a targeted cluster. Job manager module 220 may select one or more clusters to run the map-reduce job based on the characteristic. As described above, the job manager module 220 may cause the data to be moved from one location to another location in order to execute an MR job on a particular framework executing on a computer cluster.

In another example, the characteristics include the capacity of at least one of the CPU, network, or memory of a node or cluster. Capacity of the CPU and the network is the amount of data the CPU or network can handle over a time period. Memory capacity is the amount of memory storage of a node or cluster which may be measured in bits. Additionally, a characteristic may be disk access speed for a cluster which is the amount of data that may be accessed on disk storage by a cluster or node, which may be measured in bits per second. Job manager module 220 may query each cluster using a system call requesting the characteristic of a targeted cluster. Job manager module 220 may select one or more clusters to run the map-reduce job based on the characteristic. For example, two clusters may be both running the Hadoop framework. However, one cluster may be using old hardware while the other may be using state-of-the-art hardware. An MR job run on state-of-the-art hardware may be faster than on old hardware. Job manager module 220, may query each cluster for one or more indications of CPU capacity, network capacity, or memory capacity, compare the indications, and select a cluster based on the comparison.

In another example, job manager module 220 may identify the specific map-reduce language that is associated with the selected clusters by identifying the type of a software framework being run on the selected clusters. The identified map-reduce language corresponds to the software framework being run on the selected clusters. In one example, job-manager module 220 sends a system call to the selected clusters to query the selected clusters on the MR framework operating on the cluster. In another example, map-reduce management module 130 keeps a record of the MR frameworks operating on each cluster, and periodically updates the record when the MR framework of a cluster changes. Job manager module 220 may identify a type of software framework being run on the selected clusters and communicate the identified type to conversion module 210 so that the conversion module 210 may convert the MR job into the framework-specific MR language.

Map-reduce management module 130 also includes conversion module 210 that converts the map-reduce job written in the original map-reduce language into the map-reduce job written in a language supported by the selected clusters. As stated above, the original map-reduce language is the language in which the MR job is received, and may be provided by a general map-reduce language. The general MR language may be a language that describes the functions supported by multiple frameworks but is not specific to any MR framework. Map-reduce language module 212 of conversion module 210 may convert the received MR job written in a general MR language to a framework-specific language that corresponds to the MR framework installed on the selected clusters. Conversely, the map-reduce language module may receive the result of a map-reduce job, which is typically in the MR language of the executing clusters, and convert the result into a general MR language. Once the result is in the general MR language, the result may be converted to any framework specific language. Map-reduce language module 212 may convert a general MR language into various MR languages (i.e., framework-specific languages) and convert any number of MR languages into a general MR language, as illustrated by framework language 211A and 211B.

Figure 3:
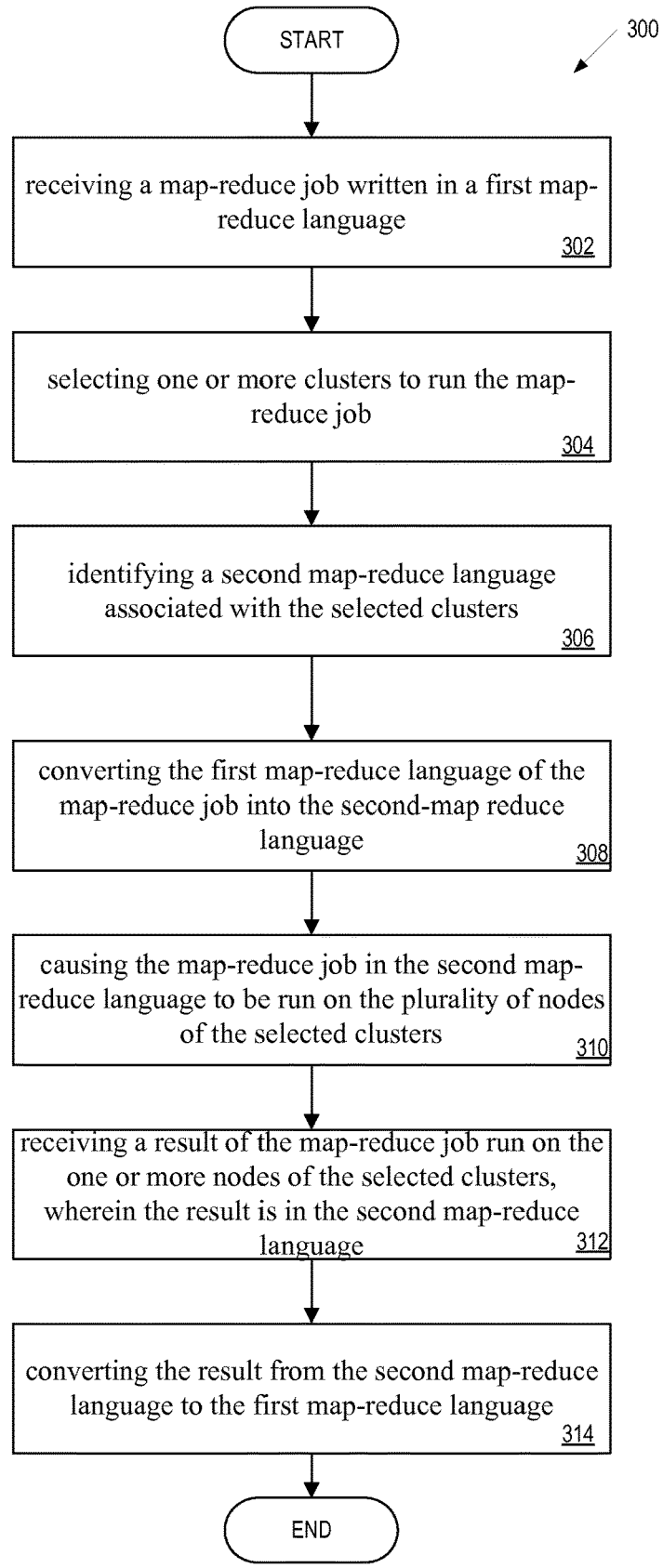
FIG. 3 is a flow diagram illustrating an example method for scheduling and converting a map-reduce job, according to an implementation of the disclosure.

FIG. 3 is a flow diagram illustrating an example method for scheduling and converting a map-reduce job, according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by system 100 of FIG. 1. In another implementation, method 300 is performed by map-reduce management module 130 of FIGS. 1 and 2.

Method 300 begins at block 302 where the processing logic receives a map-reduce job written in a first map-reduce language. The first map-reduce language may be a general MR language. The MR job may be received from any of the client machines 102A-D at map-reduce service machine 106. The map-reduce job is to be performed in parallel on a plurality of nodes of a plurality of clusters. Additional details of block 302 are further described in regards to FIGS. 1 and 2.

Method 300 continues at block 304 where the processing logic selects one or more clusters to run the map-reduce job. The processing logic may determine an availability of the selected clusters to perform the map-reduce job. In one example, a cluster or node is available when it is able to process the MR job. When a resource is off-line it may be said to be unavailable. The processing logic may also determine the load of different clusters, each running a different MR framework. The processing logic may also determine if the data on which the MR job is to be run is available to the cluster or node. Additionally, the processing logic may determine a characteristic of the cluster, such as whether the selected cluster uses memory-based storage or disk-based storage. Processing logic may base the selection of the one or more clusters to run the map-reduce job and any one or more of the above mentioned features. Additional details of block 304 are further described in regards to FIGS. 1, 2, and 4.

Method 300 continues to block 306 where the processing logic identifies a second map-reduce language associated with the selected clusters. The second map-reduce language may be a framework-specific language that corresponds to a software framework running on the selected clusters. The software framework of the selected clusters may be different from the software framework running on the other clusters of the plurality of clusters. For example, a network of clusters may have certain clusters running the Hadoop framework while other clusters run the Infinispan framework. The processing logic may identify the map-reduce language of the selected clusters by sending a system call to the cluster or by referring to a table of frameworks run by clusters in a network. Additional details of block 306 are further described in regards to FIGS. 1 and 2.

Method 300 continues to block 308 where the processing logic converts the first-map-reduce language of the map-reduce job into the second map-reduce language. The processing logic may map the MR functions described in a general MR language (e.g., first MR language) and convert those functions to equivalent functions in the second MR language. The second MR language may be compatible with the MR framework operating on the selected clusters. Additional details of block 308 are described in regards to FIGS. 1 and 2.

Method 300 continues to block 310 where the processing logic causes the map-reduce job in the second map-reduce language to be run on the plurality of nodes of the selected clusters. In one example, the processing logic may send the MR job to the selected clusters and the MR framework executes the MR job. In another example, map-reduce service machine 106 may assign the work of the MR job to nodes in a computer cluster.

Method 300 continues to block 312 where the processing logic receives a result of the map-reduce job run on the one or more nodes of the selected clusters. The result may be in the in the MR language of the cluster executing the MR job. The result may be an output of the MR job. Method 300 continues to block 314 where the processing logic converts the result written in a second map-reduce language to results written in the first map-reduce language. In one example, the processing logic converts the result written in the specific MR language of the framework running on the selected clusters into results written in the general MR language. Processing logic may convert the general MR language to another framework-specific language. Such a conversion may help migrate a job from one MR framework to another MR framework. Additional details of block 312 are further described in regards to FIGS. 1 and 2.

Figure 4:
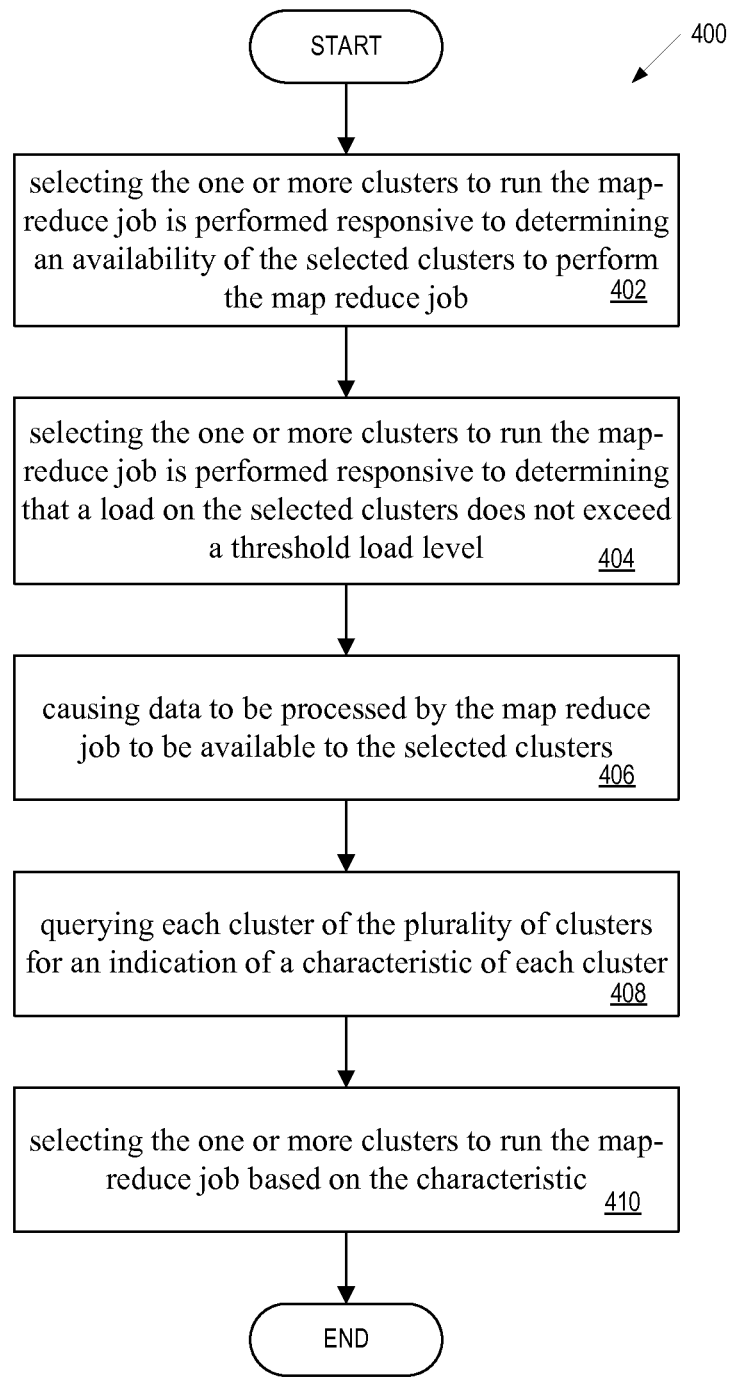
FIG. 4 is a flow diagram illustrating an example method for selecting a cluster to run a map-reduce job, according to an implementation of the disclosure.

FIG. 4 is a flow diagram illustrating an example method for selecting a cluster to run a map-reduce job, according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 300 is performed by system 100 of FIG. 1. In another implementation, method 400 is performed by map-reduce management module 130 of FIGS. 1 and 2.

Method 400 begins at block 402 where the selecting, by the processing logic, the one or more clusters to run the map-reduce job is performed responsive to determining an availability of the selected clusters to perform the map reduce job. A cluster may be available if an MR job is able to be run or completed on the cluster. If the one or more clusters are not available, the processing logic may select a different cluster. The processing logic may check if a different cluster is also available. The processing logic may scan some or all the clusters to determine which clusters are available. Additional details of block 402 are further described in respect to FIG. 2.

Method 400 continues in block 404, where the selecting, by the processing logic, of the one or more clusters to run the map-reduce job is performed responsive to determining that a load on the selected cluster does not exceed a threshold load level. Processing logic may select a different cluster of the plurality of clusters on which to perform the map-reduce job if the load exceeds a threshold load level. The different cluster may run a different software framework than the selected clusters. In one example, the load of a cluster is an indication of the degree to which the resources of a cluster are in use. The processing logic may determine the load of different clusters running different MR frameworks. In one example, the processing logic selects the cluster with the lightest load, regardless of MR framework. In such as case, the threshold load level may be determined using the lowest load of plurality of clusters, as determined by the processing logic. If a cluster is detected with a lower load, then that load becomes the new threshold load level. In another example, a threshold load level may be defined by a developer or administrator, and the determined load compared to the threshold load level. Additional details of block 404 are further discussed in regards to FIG. 2.

Method 400 continues in block 406 where the processing logic causes data to be processed by the map-reduce job to be available to the selected clusters. The processing logic may request the data to be moved to make the data available to the selected clusters if the data to be processed by the map-reduce job is not available to the selected clusters. The processing logic may determine if the data is available to the selected cluster by making a system call to the cluster or to individual nodes of the selected cluster. Additional details of block 406 are further described in regards to FIG. 2.

Method 400 continues in block 408 where the processing logic queries each cluster of the plurality of clusters for an indication of a characteristic of each cluster. In block 410, the processing logic selects the one or more clusters to run the MR job based on the characteristic. Characteristics include memory-based storage and disk-based storage. As noted above, different frameworks process data for an MR job from different locations. The processing logic may query a cluster using a system call to determine where the data in question is located, disk-based or memory-based. The processing logic may select a cluster based any of the above characteristics. Additional details of block 408 and block 410 are discussed in regards to FIG. 2.

Figure 5:
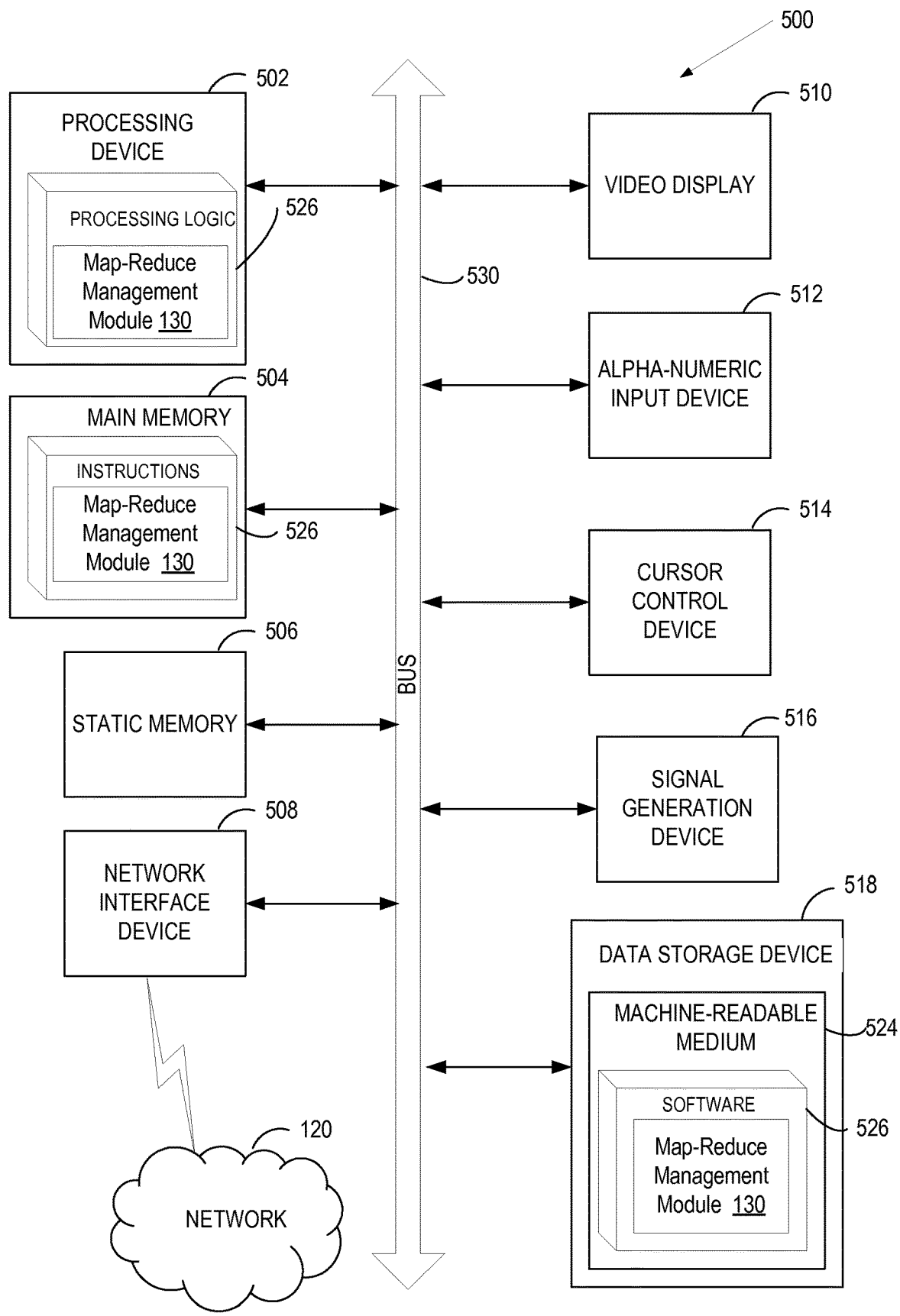
FIG. 5 illustrates a block diagram of an example computer system that may implement systems and methods described herein.

FIG. 5 illustrates a block diagram of an example computer system that may implement systems and methods described herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508 communicably coupled to a network 120. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 to implement the map-reduce management module 130 to implement any one or more of the methodologies of functions described herein in a computer system, such as the system described with respect to FIG. 1, and/or a software library containing methods that call the above applications.

While the machine-accessible storage medium 524 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "converting", "causing", "determining", "selecting", "requesting", "querying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular example shown and described by way of illustration is in no way intended to be considered limiting. Therefore, references to details of various examples are not intended to limit the scope of the claims, which in themselves recite only those features regarded as the disclosure.

What is claimed is:

1. A method comprising:
identifying a job written in a first language, wherein the job is to be performed in parallel on a plurality of nodes of a plurality of clusters, wherein the first language describes functions supported by multiple frameworks but is not specific to any of the multiple frameworks;
selecting one or more clusters from the plurality of clusters to run the job, wherein the selected one or more clusters of the plurality of clusters operate a different framework from other clusters of the plurality of clusters;
identifying a second language associated with the selected one or more clusters;
converting the first language of the job into the second language; and
causing the job in the second language to be run on the plurality of nodes of the selected one or more clusters.

2. The method of claim 1, further comprising:
receiving a result of the job run on one or more nodes of the selected one or more clusters, wherein the result is in the second language; and
converting the result from the second language to the first language.

3. The method of claim 1, wherein the second language is a framework-specific language that corresponds to a software framework running on the selected one or more clusters.

4. The method of claim 1, wherein the job comprises a map-reduce job, wherein the first language comprises a first map-reduce language, wherein the second language comprises a second map-reduce language, wherein the multiple frameworks comprise map-reduce frameworks, and wherein the first language is a general language that describes the functions supported by the multiple frameworks but is not specific to any of the multiple frameworks.

5. The method of claim 1, wherein identifying the second language associated with the selected one or more clusters further comprises:
identifying a software framework being run on the selected one or more clusters, wherein the second language corresponds to the identified software framework.

6. The method of claim 1, wherein selecting the one or more clusters from the plurality of clusters to run the job is performed responsive to determining an availability of the selected one or more clusters to perform the job.

7. The method of claim 1, wherein selecting the one or more clusters from the plurality of clusters to run the job is performed responsive to determining that a load on the selected one or more clusters does not exceed a threshold load level.

8. The method of claim 1, wherein selecting the one or more clusters from the plurality of clusters to run the job further comprises:
causing data to be processed by the job to be available to the selected one or more clusters.

9. The method of claim 1, wherein selecting the one or more clusters from the plurality of clusters to run the job further comprises:
querying each cluster of the plurality of clusters for an indication of a characteristic of each cluster; and
selecting the one or more clusters to run the job in view of the characteristic.

10. The method of claim 9, wherein the characteristic comprises at least one of disk-based storage or memory-based storage.

11. A system comprising:
a memory; and
a processing device, operatively coupled with the memory, to execute instructions, the processing device to:
identify a job written in a first language, wherein the job is to be performed in parallel on a plurality of nodes of a plurality of clusters, wherein the first language describes functions supported by multiple frameworks but is not specific to any of the multiple frameworks;
select one or more clusters from the plurality of clusters to run the job, wherein the selected one or more clusters of the plurality of clusters operate a different framework from other clusters of the plurality of clusters;
identify a second language associated with the selected one or more clusters;
convert the first language of the job into the second language; and
cause the job in the second language to be run on the plurality of nodes of the selected one or more clusters.

12. The system of claim 11, wherein the processing device further to:
receive a result of the job run on one or more nodes of the selected one or more clusters, wherein the result is in the second language; and
convert the result from the second language to the first language.

13. The system of claim 11, wherein to identify the second language associated with the selected one or more clusters, the processing device further to:
identify a software framework being run on the selected one or more clusters, wherein the second language corresponds to the identified software framework.

14. The system of claim 11, wherein to select the one or more clusters from the plurality of clusters to run the job is performed responsive to determining that a load on the selected or more clusters does not exceed a threshold load level.

15. The system of claim 11, wherein to select the one or more clusters from the plurality of clusters to run the job, the processing device further to:
cause data to be processed by the job to be available to the selected one or more clusters.

16. A non-transitory computer readable storage medium including instructions that, when executed by a processing device, cause the processing device to:
identify a job written in a first language, wherein the job is to be performed in parallel on a plurality of nodes of a plurality of clusters, wherein the first language describes functions supported by multiple frameworks but is not specific to any of the multiple frameworks;
select, by the processing device, one or more clusters from the plurality of clusters to run the job, wherein the selected one or more clusters of the plurality of clusters operate a different framework from other clusters of the plurality of clusters;
identify a second language associated with the selected one or more clusters;
convert the first language of the job into the second language; and
cause the job in the second language to be run on the plurality of nodes of the selected one or more clusters.

17. The non-transitory computer readable storage medium of claim 16, the processing device further to:

receive a result of the job run on one or more nodes of the selected one or more clusters, wherein the result is in the second language; and convert the result from the second language to the first language.

18. The non-transitory computer readable storage medium of claim 16, wherein to identify the second language associated with the selected one or more clusters, the processing device further to:

identify a software framework being run on the selected one or more clusters, wherein the second language corresponds to the identified software framework.

19. The non-transitory computer readable storage medium of claim 16, wherein to select the one or more clusters from the plurality of clusters to run the job is performed responsive to determining that a load on the selected one or more clusters does not exceed a threshold load level.

20. The non-transitory computer readable storage medium of claim 16, wherein to select the one or more clusters from the plurality of clusters to run the job, the processing device further to:

cause data to be processed by the job to be available to the selected one or more clusters.

\* \* \* \* \*